J. N. OUTTEN.
Bee Hive.

No. 82,634.

Patented Sept. 29, 1868.

United States Patent Office.

J. N. OUTTEN, OF CASEYVILLE, KENTUCKY.

Letters Patent No. 82,634, dated September 29, 1868.

IMPROVEMENT IN BEE-HIVES.

*The Schedule referred to in these Letters Patent and making part of the same.*

TO ALL WHOM IT MAY CONCERN:

Be it known that I, J. N. OUTTEN, of Caseyville, in the county of Union, and in the State of Kentucky, have invented certain new and useful Improvements in Bee-Hives; and do hereby declare that the following is a full, clear, and exact description thereof, reference being had to the accompanying drawings, and to the letters of reference marked thereon.

The nature of my invention consists in placing the honey-boxes on a series of steps in the hive, which steps give the hive its peculiar shape, and make it dissectible, and give it a fall for moth or anything else the bees may wish to expel. The opening to the hive being underneath, it gives a protection from attacks of the bees while taking the honey or cleaning the hive, as the hive will be between the person operating and the outside bees.

In order to enable others skilled in the art to make and use my invention, I will now proceed to describe its construction and operation, referring to the annexed drawings, which form a part of this specification, and in which—

Figure 1:
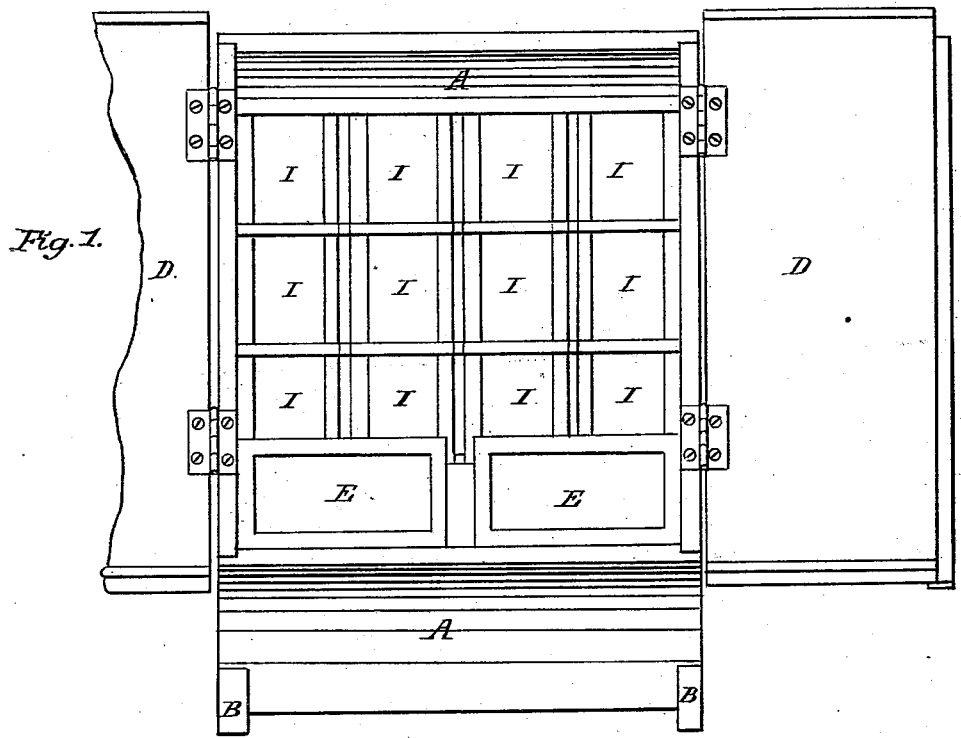
Figure 2:
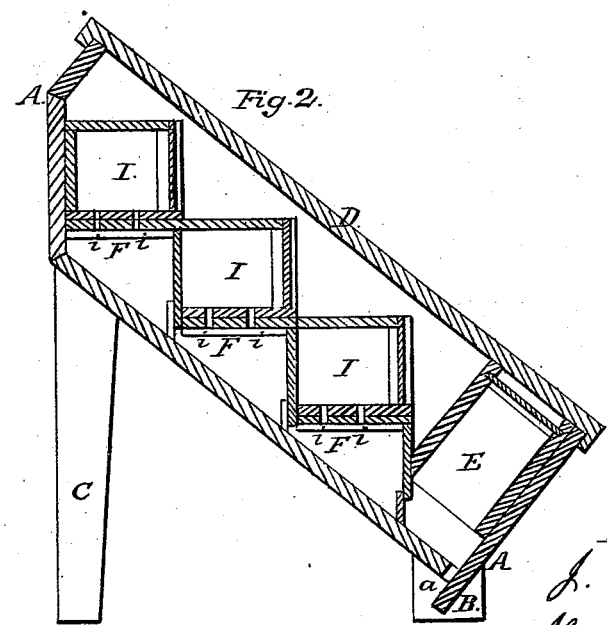

Figure 1 is a front view, and
Figure 2 is a vertical section.

A represents the hive or palace, which is in any shape or form desired, but placed in an inclined position, and resting on legs, so that the front legs, B B, are short, bringing the front end of the hive near the ground, and the rear legs, C C, are high. The upper side of the hive is closed by doors D D in any manner desired.

The lower front end of the bottom of the hive has a slot, $a$, through which the bees enter the chambers E E, which are placed along the front end of the hive.

The balance of the hive is arranged with steps F F, commencing from the side of the chambers and rising upwards. These steps are so arranged that the bees can pass along the bottom of the hive under the steps, but cannot get above the steps, except through the openings $i\ i$, which lead into the honey-boxes.

The honey-boxes I I are placed on the said steps, and their bottoms perforated with openings similar to those on the steps, and fitting just over them, so that the bees passing through the same may enter the honey-boxes.

The upper ends of the chambers E E, as well as the front ends of the honey-boxes, are provided with glass, to admit light.

Having thus fully described my invention, what I claim as new, and desire to secure by Letters Patent, is—

The steps F F, when arranged and used in combination with the chambers E E and honey-boxes I I, inside of a bee-hive, substantially as and for the purposes herein set forth.

In testimony that I claim the foregoing, I have hereunto set my hand, this 17th day of June, 1868.

J. N. OUTTEN.

Witnesses:
R. F. JONES,
C. A. ANDERSON.